United States Patent
Righi et al.

(10) Patent No.: US 7,215,532 B2
(45) Date of Patent: May 8, 2007

(54) METHOD AND MACHINE FOR MANUFACTURING ENERGY ACCUMULATING COMPONENTS, AND COMPONENTS MADE THEREBY

(75) Inventors: Sauro Righi, Sasso Marconi (IT); Mirko Mazza, Marzabotto (IT)

(73) Assignee: Arcotronics Industries S.p.A, Sasso Marconi (IT)

(*) Notice: Subject to any disclaimer, the term of this patent is extended or adjusted under 35 U.S.C. 154(b) by 267 days.

(21) Appl. No.: 11/059,673

(22) Filed: Feb. 17, 2005

(65) Prior Publication Data

US 2005/0188533 A1    Sep. 1, 2005

(30) Foreign Application Priority Data

Feb. 27, 2004  (IT) .......................... BO2004A0120

(51) Int. Cl.
*H01G 9/00*  (2006.01)

(52) U.S. Cl. ...................... 361/502; 361/504; 361/508; 361/512; 361/518; 429/94; 429/127; 429/162; 429/163; 429/171; 429/174; 29/623.1

(58) Field of Classification Search ........ 361/502–504, 361/508–512, 514–518, 523, 525, 528; 429/94, 429/127, 162–163, 171–174; 29/623.1
See application file for complete search history.

(56) References Cited

U.S. PATENT DOCUMENTS

| | | | |
|---|---|---|---|
| 2,506,314 A | | 5/1950 | Nordberg |
| 3,001,734 A | | 9/1961 | Wellington |
| 5,017,442 A | * | 5/1991 | Watanabe et al. ............. 429/94 |
| 5,563,582 A | * | 10/1996 | D'Hont ................... 340/572.5 |
| 6,021,040 A | * | 2/2000 | Suzuki et al. ............... 361/514 |
| 6,054,233 A | * | 4/2000 | Vourlis ........................ 429/61 |
| 6,236,127 B1 | * | 5/2001 | Bornemann .................. 310/74 |
| 2001/0019795 A1 | | 9/2001 | Yoshida et al. |

FOREIGN PATENT DOCUMENTS

EP                  1 170 813 A      1/2002

* cited by examiner

*Primary Examiner*—Nguyen T. Ha
(74) *Attorney, Agent, or Firm*—Modiano & Associati; Albert Josif; Daniel O'Byrne

(57) ABSTRACT

A method for manufacturing electrical components of the energy-accumulating electrostatic or electrochemical type, consisting in winding at least two layers of a film on a support made of an electrically nonconducting material that has a substantially polygonal cross-section, by providing a preset number of film turns until a predefined thickness is reached, and forming a first layer; arranging respective spacers at the corners of the polygon in which the contour of the wound film is inscribed; and winding more turns of film around the first layer and around the spacers inserted at the corners, to form a second layer. A machine by means of which the method is performed comprises a rotatingly mounted frame on which the support is fixed for winding of the layer of film.

46 Claims, 5 Drawing Sheets

METHOD AND MACHINE FOR MANUFACTURING ENERGY ACCUMULATING COMPONENTS, AND COMPONENTS MADE THEREBY

BACKGROUND OF THE INVENTION

The present invention relates to a method for manufacturing electrical components of the energy-accumulating electrostatic or electrochemical type (such as for example plastic film capacitors, double-layer capacitors, supercapacitors and primary and secondary batteries), to the machine that performs the method, and to the components provided according to the method (for example with said machine).

The current method of providing film-type capacitors made of a metallized material such as plastics (hereinafter termed simply "metallized plastic film", that is assumed to include all of the films made of polymeric materials or with natural rubbers having at least one surface coated with an electrically conducting material) entails a first winding step, during which two or more superimposed plastic films are wound onto a support (having variable shapes and dimensions depending on the geometric and electrical characteristics of the capacitor to be provided). Mechanical compaction is then performed by applying pressure (associated with heating or not) in order to give the component a structural consistency and stability that are substantially constant over time.

A layer of conducting material is then applied (usually by spraying) on the plastic films to provide an interface between the metalized layer that is already present on one surface of the wound plastic films (with a thickness in the region of 400 angstroms) and the electrical terminations for the flow of current. The metallic terminals (designed to feed the current) that will allow to connect the capacitor to an electric circuit are in fact soldered to these deposited metallic interfaces. As a final step, the capacitor is inserted in the corresponding casing and sealed therein by pouring particular thermosetting resins.

The advantage of this type of production arises from various factors: first of all, the high stability of the electrical characteristics over time, the capability to work with high transient or continuous voltages thanks to the self-regeneration of the material used as dielectric, the possibility to work at high frequencies thanks to the low dielectric losses, the possibility to bear high current peaks, and a failure behavior similar to that of an open circuit (open-type failure mode).

By following this constructive principle, substantially two different types of capacitor are currently manufactured: wound capacitors and stacked layer capacitors.

In wound capacitors, two or more plastic films having at least one metallized surface are wound onto a support (that can be made of substantially any material), which can be removed or not at the end of the winding process. If said support is left inside the capacitor, the shape of the capacitor will be substantially cylindrical; if the support is removed, as a consequence of compaction the capacitor will generally assume a substantially oval shape. Thermomechanical stabilization, deposition of the metallic layer to which the terminals for feeding current will be connected, and impregnation in a resin lead to the finished product.

The resulting component has limited flexibility in occupying the various geometric requirements of the end user (particularly in the case of production of cylindrical components) and in saturating the volume available for installation of the component (the available spaces are generally polygonal and almost never circular).

In stacked capacitors, two or more layers of metallized film are wound on a support that is shaped like a parallelepiped. The final shape of the component is substantially always ovoid but more elongated, depending on the dimensional ratio of the supporting parallelepiped (in practice, the shape duplicates the shape of the initial bar, with ends that are radiused along circular arcs). These wound films are stabilized by compression and then the metallic layer is deposited onto the two surfaces. The radiused ends of the wound films are then removed and the films are divided (by means of a transverse cut) in a plurality of segments having the chosen length (a particular value of capacitance being associated with the length of the component). The critical points of this technology are first of all the high process waste due to the need to eliminate the entire radiused end region (the percentage of waste material can reach as much as 30%); secondly, it must be noted that with this technology it is possible to obtain only elements that have a thickness of no more than 20 mm, since if the thickness is increased it is not possible to maintain the mechanical tolerances related to the coupling between the various layers, which are required in order to ensure stable electrical characteristics. Finally, it should be noted that the region at which cutting occurs is a highly critical point for voltage transients, and due to the difficulty in providing very thick elements, the inductance of capacitors with a high capacitive value is always very high (inductance is directly proportional to the width of the capacitor).

SUMMARY OF THE INVENTION

The aim of the present invention is to obviate the cited drawbacks and meet the mentioned requirements, by providing a method for manufacturing electrical components of the energy-accumulating electrostatic or electrochemical type, capable of having even high values of energy accumulation capacity, operating even at medium and high frequency, with high voltage and current transients, capable of maximizing the saturation of the volumes available for installation of the component and of minimizing the waste of material.

This aim is achieved by means of an appropriately provided machine, suitable for carrying out a method for manufacturing energy-accumulating components and leads to the provision of components having excellent electrical characteristics, with high saturation of the installation spaces, obtained without removing material.

Within this aim, an object of the present invention is to provide a machine that is simple, relatively easy to provide in practice, safe in use, effective in operation, and has a relatively low cost.

This aim and this and other objects that will become better apparent hereinafter are achieved by the present method for manufacturing electrical components of the energy-accumulating electrostatic or electrochemical type, comprising:

providing a support of an electrically nonconducting material that has a substantially polygonal cross-section;

winding, on said support, turns of a film until a first layer with a predefined thickness is provided, said first layer forming a cross-sectional contour shape that inscribes in a polygon;

arranging spacers at locations of said first layer shape that correspond to corners of said polygon; and winding around said first layer shape with the spacers arranged at corners, further turns of film that form a second layer of film.

This aim and this and other objects are also achieved by a machine for manufacturing electrical components of an energy-accumulating electrostatic or electrochemical type, comprising:

a speed- and position-controlled motor that has a rotating output shaft;

a frame, fixed for rotation on said output shaft, said frame comprising a central part and branches departing therefrom, said branches having thereon a plurality of fixing holes;

a support, made of an electrically nonconducting material, that has a substantially polygonal cross-sectional shape with corners forming angles;

a plurality of spacers;

a plurality of rolls for storing film thereon;

wherein said support is fixed at said central part of the frame so that the branches thereof lay along bisecting lines of the angles formed by said corners of the support, with said fixing holes distributed along, and aligned on said branches so that each one of said fixing holes is adapted to accommodate a respective spacer, and wherein film unwound from said rolls is windable about said support to form successive polygonal film layer configurations with spacers interposed at corners of respective ones of the layer configurations.

This aim and this and other objects are evident in the provision of an electrical energy-accumulating component of the electrostatic or electrochemical type, of the type that comprises a winding of films made of a material such as plastics which are metallized and mutually adjacent, characterized in that said element has a substantially polygonal shape, reproducing the shape of the internal support on which it has been wound and being constituted by a series of superimposed layers of wound film that are mutually separated by means of spacers arranged at each outer corner of each layer.

BRIEF DESCRIPTION OF THE DRAWINGS

Further characteristics and advantages of the present invention will become better apparent from the following detailed description of a preferred but not exclusive embodiment of a method for providing electrical components of the energy-accumulating electrostatic or electrochemical type, of a machine that performs said method, and of components provided according to the method, illustrated by way of nonlimiting example in the accompanying drawings, wherein.

DESCRIPTION OF THE PREFERRED EMBODIMENTS

Figure 1:
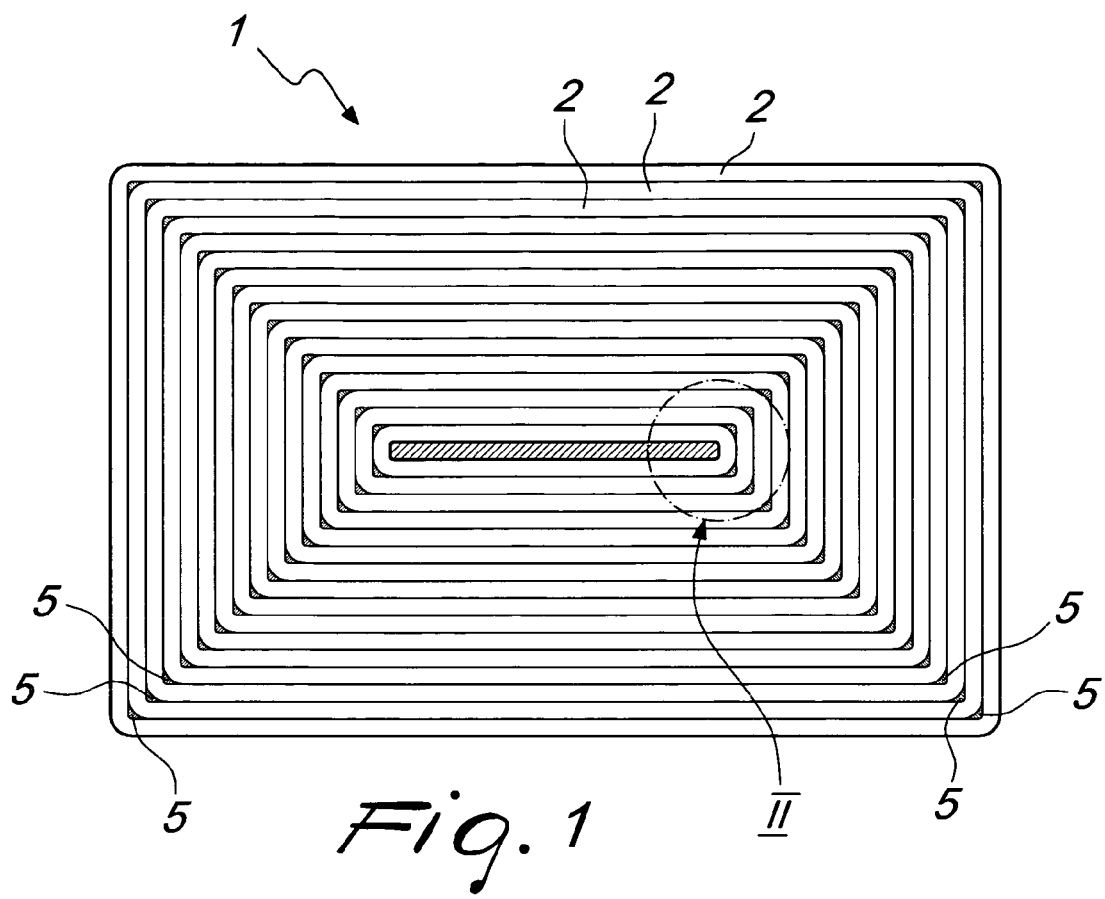
FIG. 1 is a plan view of an energy-accumulating component provided by following the method according to the invention.
Figure 2:
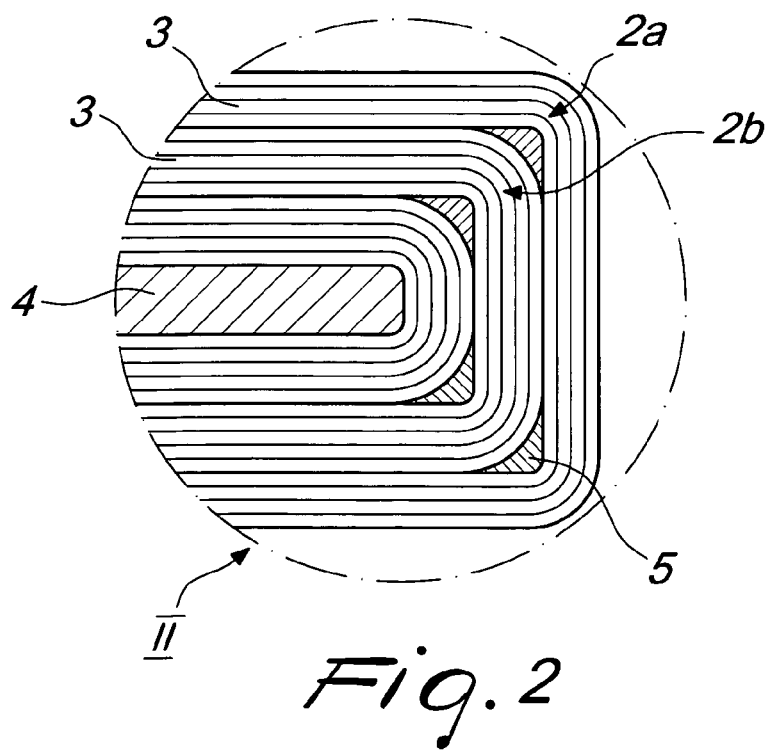
FIG. 2 is an enlarged-scale plan view of the detail II shown in FIG. 1.
Figure 3:
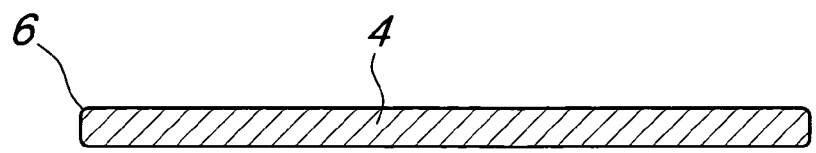
FIG. 3 is a plan view of a support on which the film is to be wound to provide a component according to the invention.
Figure 4:
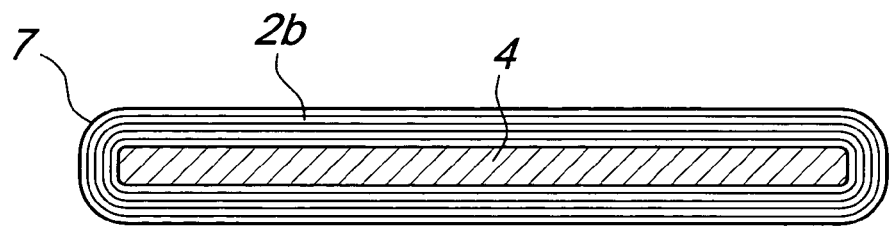
FIG. 4 is a plan view of a support on which a first layer of wound film is arranged.
Figure 5:
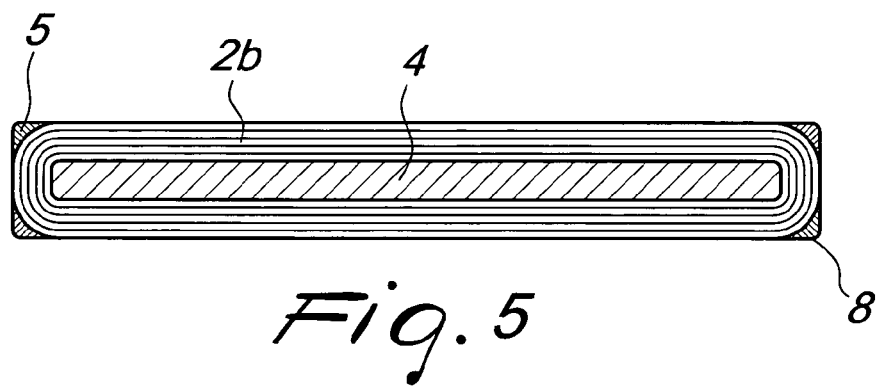
FIG. 5 is a plan view of a support on which a first layer of wound film is arranged, the spacers being arranged on the outside of said film at the corners.
Figure 6:
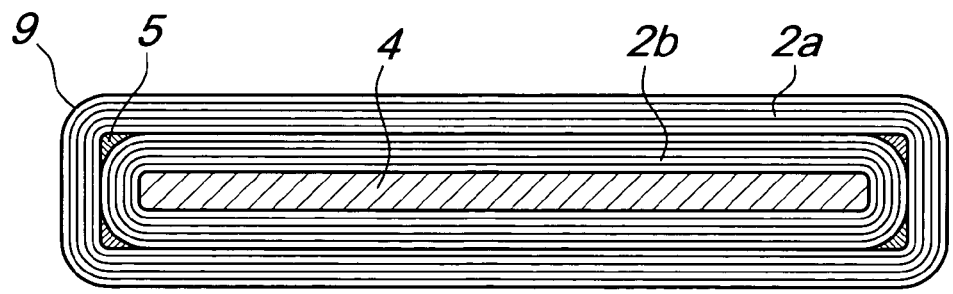
FIG. 6 is a plan view of a support on which a first layer of wound film is arranged, the spacers being arranged on the outside of said layer at the corners, a second layer of wound film being provided thereon.
Figure 7:
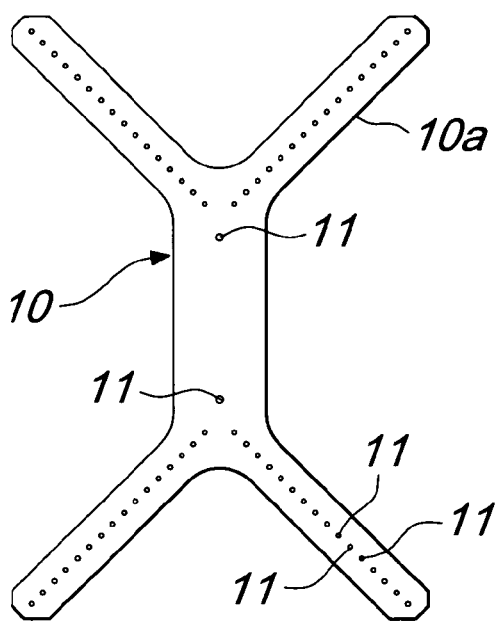
FIG. 7 is a plan view of a frame designed to accommodate the support and the spacers.
Figure 8:
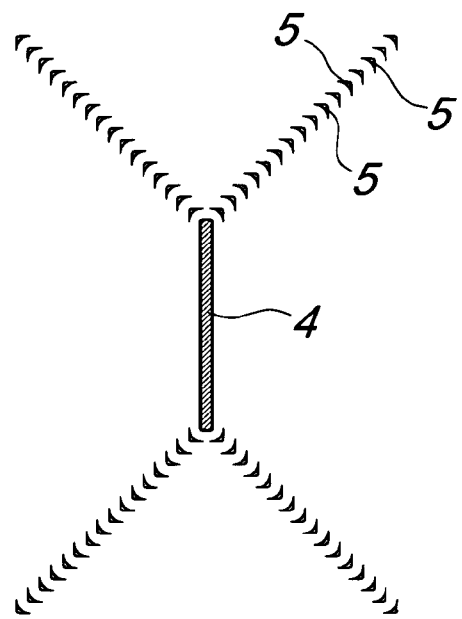
FIG. 8 is a plan view of the arrangement of the support and of the spacers.
Figure 9:
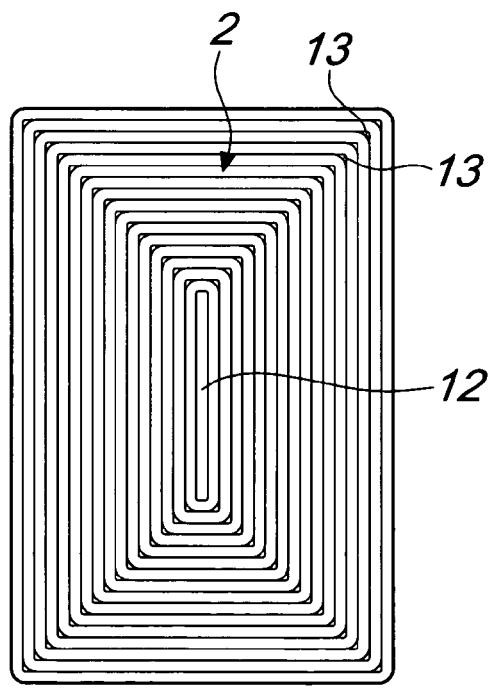
FIG. 9 is a plan view of a component without the support and the spacers.
Figure 10:
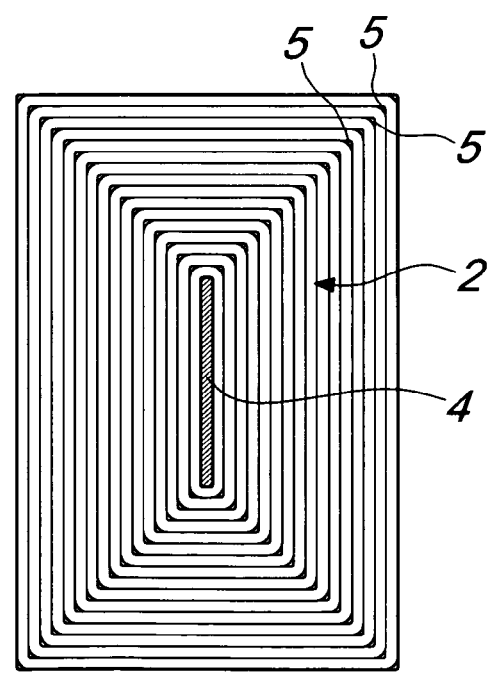
FIG. 10 is a plan view of a possible embodiment of a component according to the invention.
Figure 11:
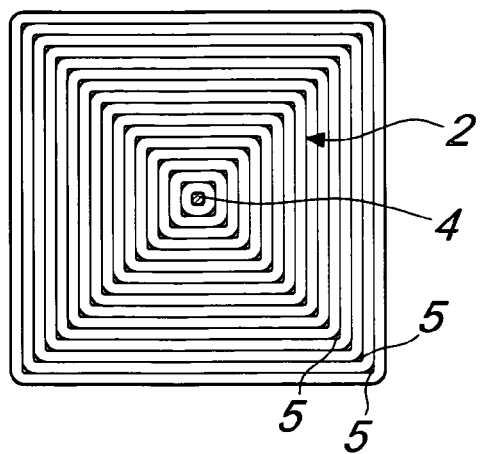
FIG. 11 is a plan view of a possible embodiment of a component according to the invention.
Figure 12:
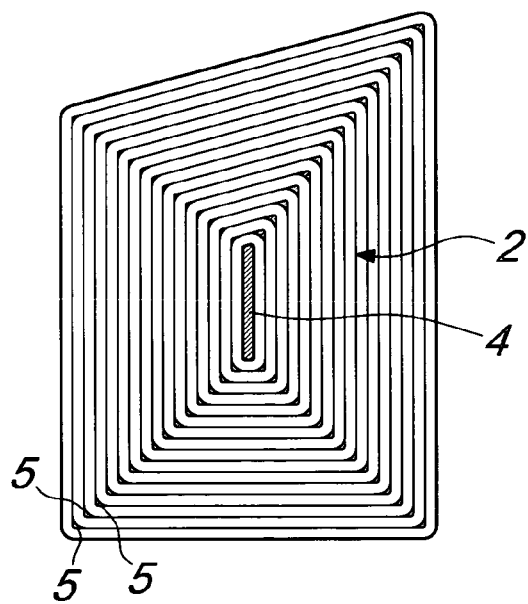
FIG. 12 is a plan view of a possible embodiment of a component according to the invention.
Figure 13:
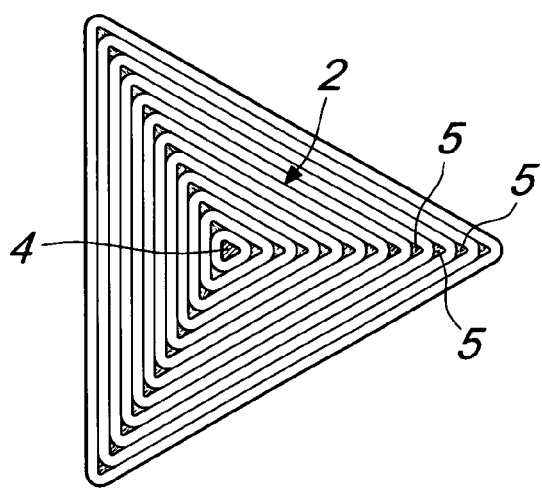
FIG. 13 is a plan view of a possible embodiment of a component according to the invention.
Figure 14:
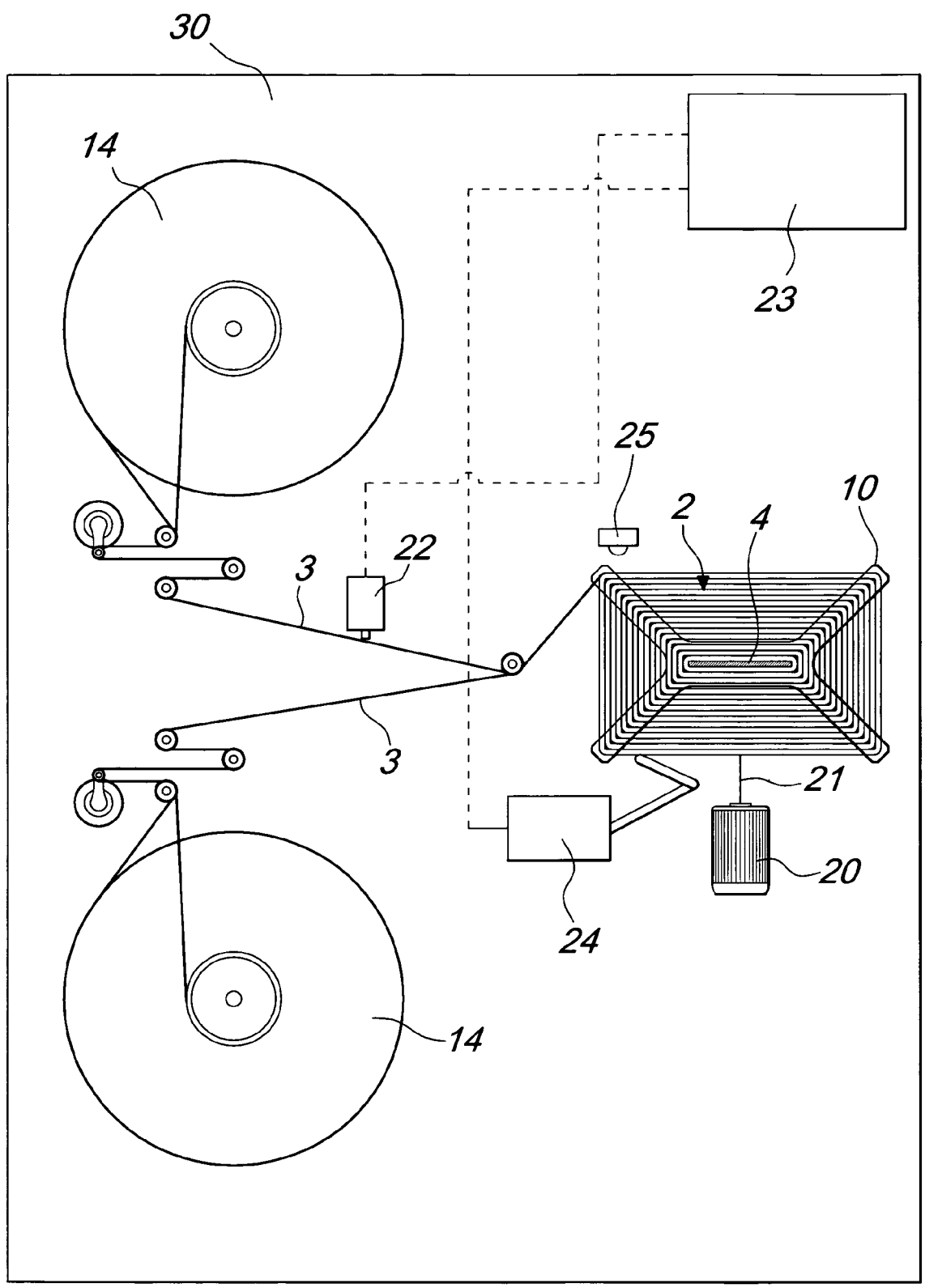
FIG. 14 is a plan view of a possible embodiment of a machine for providing a component according to the invention.

With reference to the figures, the reference numeral 1 generally designates a capacitor provided according to the method.

The capacitor 1 is constituted by a plurality of layers 2 of film 3 made of a material such as plastics, provided with a metallized surface and wound onto a support 4, each outer layer 2a being separated from the inner layer 2b (at the corners) by means of respective spacers 5.

The support 4 and spacers 5 can be made of any suitable material, such as known electrically nonconducting materials.

The support 4 can have any shape, provided that in plan view none of its internal angles exceeds 180° (for example, a star-shaped support cannot be used).

Its corners have a radiusing provided by a radius of curvature 6 that is preferably set to 1 mm (different radii of curvature, greater or smaller than this one even by a few orders of magnitude, can be preferred in other applications).

The film 3 is wound onto the support 4 until an inner layer 2b of the intended thickness is provided that forms in cross-section a polygonal configuration with radiused corners. At the corners of the layer 2b a radiusing with a radius of curvature 7 is provided that is equal to the sum of the radius of curvature 6 of the support 4 and the thickness of the layer 2b.

The spacers 5 are arranged at the corners of the inner layer 2b and in plan (or cross-sectional) view are shaped like an irregular triangle with two straight sides and one side constituted by a circular arc or arc-shaped region with a radius equal to the radius of curvature 7. The curved side must be rested on the corner, in contact with the curved surface of the layer 2b; the straight sides are mutually radiused along a radius of curvature 8 similar to the radius 6.

An outer layer 2a is then arranged over the inner layer 2b and the spacers 5, and winding continues until the intended thickness is reached. In this condition, the radius of curvature 9 that corresponds to the radiusing in the corner of the outer layer 2a is equal to the sum of the radius 8 and of the thickness of the layer 2a.

By repeating the process, it is possible to provide an arbitrary number of overlapping layers that form a sequence of first and second layers with interposed at corner spaces 13 that are provided by discontinuities between one layer and the subsequent one. Such sequence of layers is matched by even high values of capacitance of the resulting capacitor 1.

In order to provide the capacitor 1 in practice, it is necessary to have a frame 10 provided with branches 10a with fixing holes 11 for accommodating the support 4 and the spacers 5; the frame 10 substantially reproduces the shape of the support 4 that it must accommodate, and the holes 11 designed to accommodate the spacers 5 are aligned along the branches 10a that lay along the bisecting line of the corresponding corner of the support 4.

If one tried to remove the support 4 and all the spacers 5 from a capacitor 1, said capacitor would have a central empty space 12 and many small spaces 13 distributed along the direction of the bisecting lines of the corners of the capacitor 1.

Capacitors 1 provided according to the teachings of the invention can have practically any cross-section (depending on the requirements of the installation space); for example, they can have a triangular cross-section (any kind of triangle), or a square, rectangular or trapezoidal cross-section (regular or irregular).

Examples of components that can be obtained, according to the invention, are: supercapacitors, electrolytic capacitors, polymeric electrolytic capacitors, double-layer capacitors (known commercially as DCL), hybrid double-layer capacitors (known commercially as REDOX), lithium batteries, lithium-polymer batteries or lithium ion batteries.

It may be convenient to provide no metalization on the film 3 at the portion that lies proximate to the spacers 5, in order to avoid discharge phenomena caused by particular electrical field gradients that occur in these locations.

The machine that provides the capacitor 1 comprises a supporting structure 30 on which the frame 10, which is fixed on the rotating shaft 21 of a speed- and position-controlled motor 20, and a plurality of rolls 14 for storing the film made of a material such as metallized plastics are supported. The rotation of the frame 10 winds the film first onto the support 4 and then onto the various superimposed layers 2.

At each surface of discontinuity between layers 2, actuators 24 arrange the spacers 5 in the respective holes 11 of the frame 10. Sensors 25 are provided that check the thickness of each layer 2; when said thickness is within a certain tolerance, similar to the preset thickness, the motor is stopped and the actuators arrange the spacers 5.

Emitters of laser beams or equivalent electronic and/or mechanical devices are arranged along the path of the film 3 and constitute removal means 22 adapted to remove the metalization from its surface at the portions that will be arranged in contact with, or in the vicinity of, one of the spacers 5. The removal means 22 are driven/controlled by a management and control unit 23.

Advantageously, the resulting capacitor 1 has an available volume filling coefficient that is much higher than conventional ones, since it maintains the shape of the support 4 without having regions with curves that vary depending on the thickness of each layer 2.

Positively, the capacitor 1 is highly flexible with respect to the shapes of the spaces available to clients: in conventional embodiments, only ovoid or cylindrical shapes are available, whereas with the present invention the shape of the final object is determined by the shape of the initial support 4.

Conveniently, it has more uniform electrical characteristics, since it is compacted by acting simultaneously on all sides and there are no irregular regions (in providing the wound film there remain considerable non-uniformities between the flat region and the curved region, which in this case can be compacted).

Advantageously, it has a lower level of inductance, since it is possible to obtain capacitors 1 having the same capacitive value by using films 3 with reduced heights.

Finally, it should be noted that by means of the demetalizations performed on the film 3 before or during the winding step, the element has intrinsic-safety devices against voltage and current transients.

It has thus been shown that the invention achieves the intended aim and object.

The invention thus conceived is susceptible of numerous modifications and variations, all of which are within the scope of the appended claims.

For example, it is possible to provide spacers 5 that have a substantially cylindrical shape. The cylindrical spacers 5 can be particularly suitable to provide batteries and accumulators, where compaction does not have to be particularly thorough as in the capacitors 1.

All the details may further be replaced with other technically equivalent ones.

In the embodiments shown, individual characteristics, given in relation to specific examples, may actually be interchanged with other different characteristics that exist in other embodiments.

Moreover, it is noted that anything found to be already known during the patenting process is understood not to be claimed and to be the subject of a disclaimer.

The provision of the present invention shall be performed with the most scrupulous compliance with legal and regulatory provisions regarding the products according to the invention or correlated therewith and after authorization, if required, of the associated competent authorities, with particular reference to standards related to safety, environmental pollution and health.

In practice, the materials used, as well as the shapes and the dimensions, may be any according to requirements without thereby abandoning the scope of the protection of the appended claims.

The disclosures in Italian Patent Application No. BO2004A000120 from which this application claims priority are incorporated herein by reference.

What is claimed is:

1. A method for manufacturing electrical components of an energy-accumulating electrostatic or electrochemical type, comprising:

providing a support of an electrically nonconducting material that has a substantially polygonal cross-section;

winding, on said support, turns of a film until a first layer with a predefined thickness is provided, said first layer forming a cross-sectional contour shape that inscribes in a polygon;

arranging spacers at locations of said first layer shape that correspond to corners of said polygon; and winding around said first layer shape with the spacers arranged at corners, further turns of film that form a second layer of film.

2. The method of claim 1, wherein said film is made of an electrically nonconducting dielectric material.

3. The method of claim 2, wherein said nonconducting material is a plastic, polymeric material.

4. The method of claim 3, wherein said non-conducting material is provided with a metallized surface.

5. The method of claim 4, wherein a portion of said film with metallized surface that makes contact with said spacers is provided devoid of metalization.

6. The method of claim 5, wherein said portion of said film is subjected to a treatment for removing the metallized surface.

7. The method of claim 2, wherein said nonconducting material is a plastic material, in particular a natural rubber.

8. The method of claim 2, wherein said nonconducting material is paper.

9. The method of claim 2, wherein said nonconducting material is fabric.

10. The method of claim 1, wherein said film is made of electrically conducting material, being constituted by a conductor.

11. The method of claim 10, wherein said conducting material is provided with a surface coated with a dielectric.

12. The method of claim 1, wherein said film is made of a composite material that behaves as a semiconductor.

13. The method of claim 1, comprising providing a sequence of first and second layers, with respective spacers being provided arranged between said layers at spaces of discontinuity between one inner layer and an outward respective layer.

14. The method of claim 1, further comprising compaction of the wound layers by way of thermal and mechanical cycles, deposition of electrically conducting material on a surface of the component for application of electrical terminals thereon, and covering the component with insulating material.

15. The method of claim 3, comprising compaction of the wound layers through mechanical cycles, and deposition of electrically conducting material on a surface of the component for application of electrical terminals thereon.

16. The method of claim 1, wherein said support has a triangular cross-section.

17. The method of claim 1, wherein said support has a square cross-section.

18. The method of claim 1, wherein said support has a rectangular cross-section.

19. The method of claim 1, wherein said support has a trapezoidal cross-section.

20. The method of claim 1, wherein all internal polygonal corners of said support are provided to measure less than 180°.

21. An electrical or electrochemical energy-accumulation component made according to the method of claim 1, being constituted by film windings made of a plastic material that are metallized and mutually adjacent, wherein the component has a substantially polygonal shape that reproduces a shape of an internal support on which the film has been wound, and is constituted by a plurality of layers of wound film, said layers being superimposed and mutually separated by way of spacers arranged at each outer corner of a polygonal shape constituted by each layer.

22. The component of claim 21, wherein each one of said layers has a thickness of no more than 50 mm.

23. The component of claim 22, wherein each one of said layers has a preferred thickness of about 5 mm.

24. The component of claim 21, wherein said layers are at least two.

25. The component of claim 21, covered with nonconducting material.

26. The component of claim 21, embedded in a thermosetting resin.

27. The component of claim 21, shaped like an irregular polygon that is complementary to a space provided for accommodation thereof in use.

28. The component of claim 21, being a supercapacitor.

29. The component of claim 21, being an electrolytic capacitor.

30. The component of claim 21, being a polymeric electrolytic capacitor.

31. The component of claim 21, being a double-layer capacitor.

32. The component of claim 21, being a hybrid double-layer capacitor.

33. The component of claim 21, being a lithium battery.

34. The component of claim 21, being a lithium-polymer battery.

35. The component of claim 21, being a lithium ion battery.

36. A machine for manufacturing electrical components of an energy-accumulating electrostatic or electrochemical type, comprising:

a speed- and position-controlled motor that has a rotating output shaft;

a frame, fixed for rotation on said output shaft, said frame comprising a central part and branches departing therefrom, said branches having thereon a plurality of fixing holes;

a support, made of an electrically nonconducting material, that has a substantially polygonal cross-sectional shape with corners forming angles;

a plurality of spacers;

a plurality of rolls for storing film thereon;

wherein said support is fixed at said central part of the frame so that the branches thereof lay along bisecting lines of the angles formed by said corners of the support, with said fixing holes distributed along, and aligned on said branches so that each one of said fixing holes is adapted to accommodate a respective spacer, and wherein film unwound from said rolls is windable about said support to form successive polygonal film layer configurations with spacers interposed at corners of respective ones of the layer configurations.

37. The machine of claim 36, wherein said support has edges that are radiused along radii of less than 40 mm.

38. The machine of claim 37, wherein said support has edges that are radiused along radii of approximately 1 mm.

39. The machine of claim 36, wherein each one of said spacers is arranged at a discontinuity space formed between an outer layer and an inner layer of wound film, the spacers having each a circular arc-shaped cross-sectional region at a portion that is arrangeable to make contact with an outer surface of the film of the inner layer and an edge-like cross-section, with a vertex angle identical to a corresponding angle of said support with which the support is aligned, at a portion that is arrangeable to make contact with an inner surface of the film of the outer layer.

40. The machine of claim 39, wherein the outer layer has, at said spacers, a radius of curvature that is substantially equal to a thickness of the outer layer plus a radius of curvature of a corresponding one of said supports.

41. The machine of claim 36, wherein each one of said spacers is arranged at a discontinuity space between an outer layer and an inner layer of wound film, and has a substantially cylindrical shape.

42. The machine of claim 36, further comprising removal means for removing metalization of the film at portions of film that are proximate to the spacers and a management and control unit for driving and controlling said removal means.

43. The machine of claim 42, wherein said removal means comprises a laser emitter that is trained onto the metallized surface and is driven by said management and control unit.

44. The machine of claim 42, wherein said removal means comprises an electronic device for abrading a surface of the film.

45. The machine of claim 42, wherein said removal means comprises a mechanical device for abrading a surface of the film.

46. The machine of claim 42, comprising actuators adapted to insert said spacers at said holes, said actuators being driven by said management and control unit, and sensors for measuring a thickness of each layer and comparing said thickness with a preset thickness.

* * * * *